(12) United States Patent
Wakasa et al.

(10) Patent No.: US 7,946,495 B2
(45) Date of Patent: ***May 24, 2011

(54) INFORMATION PROVIDING SYSTEM, INFORMATION PROVIDING APPARATUS, INFORMATION PROVIDING METHOD, PORTABLE TERMINAL, INFORMATION OUTPUTTING METHOD, AND COMPUTER PROGRAM

(75) Inventors: Shigeki Wakasa, Kanagawa (JP); Jun Ogishima, Tokyo (JP); Hiroaki Ban, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,353

(22) Filed: Mar. 3, 2010

(65) Prior Publication Data

US 2010/0155466 A1      Jun. 24, 2010

Related U.S. Application Data

(63) Continuation of application No. 11/199,221, filed on Aug. 9, 2005, now Pat. No. 7,699,228.

(30) Foreign Application Priority Data

Aug. 20, 2004  (JP) .................................. 2004-240591
Mar. 10, 2005  (JP) .................................. 2005-067983

(51) Int. Cl.
     *G06K 7/10*          (2006.01)
(52) U.S. Cl. ................................................. 235/472.01
(58) Field of Classification Search .......... 235/472.01–472.03; 707/10; 709/217–228; 715/513
     See application file for complete search history.

(56) References Cited

U.S. PATENT DOCUMENTS 6,434,405 B1    8/2002  Sashihara
6,970,871 B1    11/2005 Rayburn
(Continued)

FOREIGN PATENT DOCUMENTS

JP    2000-207167    7/2000
(Continued)

OTHER PUBLICATIONS

Tomoyoshi Takebayashi, et al., "Approaches to User-Centric Computing System for Ubiquitous Solutions", Fujitsu Sci. Tech. J., vol. 39, No. 2, XP-002361508, Dec. 2003, pp. 261-269.

(Continued)

*Primary Examiner* — Jamara A Franklin
(74) *Attorney, Agent, or Firm* — Oblon, Spivak, McClelland, Maier & Neustadt, L.L.P.

(57) ABSTRACT

An information providing system includes a portable terminal including an IC chip, and an information providing apparatus that carries out wireless communications with the IC chip. The information providing apparatus includes a browser that reads content and that outputs the content on a screen based on screen-output control information embedded in the content data and defining an output format or a data structure of the content, and a wireless communication unit that carries out wireless communications with the IC chip. In the content data, transmission target information to be transmitted to the portable terminal, and transmission control information instructing transmission of the transmission target information, are also embedded. The browser instructs the wireless communication unit to transmit the transmission target information to the portable terminal based on the transmission control information. The wireless communication unit transmits the transmission target information to the IC chip based on the instruction.

20 Claims, 10 Drawing Sheets

U.S. PATENT DOCUMENTS

| 7,209,706 | B2 | 4/2007 | Fujii et al. |
| 7,406,332 | B1 * | 7/2008 | Gaillard et al. ............... 455/558 |
| 2004/0176032 | A1 | 9/2004 | Kotola et al. |

FOREIGN PATENT DOCUMENTS

| JP | 2001-5730 | 1/2001 |
| JP | 2002-125067 | 4/2002 |
| JP | 2003-248697 | 9/2003 |
| JP | 2004-29259 | 1/2004 |
| JP | 2004-30168 | 1/2004 |
| JP | 2004-140709 | 5/2004 |
| JP | 2004-151774 | 5/2004 |
| JP | 2004-153389 | 5/2004 |
| JP | 2004-177586 | 6/2004 |
| JP | 2004-180272 | 6/2004 |
| JP | 2004-207838 | 7/2004 |

OTHER PUBLICATIONS

Eiji Murakami, et al., "Collaborative Filtering for a Distributed Smart IC Card System", 'Online! 2001, XP-002361509, 2001, pp. 183-197.

Tatsuo Itabashi, "Internet Based Personalized Services for Public Transportation", Vehicular Technology Conference, XP-010701412, Oct. 6, 2003, pp. 3351-3353.

Hui Lei, et al., "DataX: an Approach to Ubiquitous Database Access", Mobile Computing Systems and Applications, XP-010323393, Feb. 25, 1999, pp. 70-79.

Staffan Björk, et al., West: A Web Browser for Small Terminals, UIST. Proceedings of the Annual ACM Symposium on User Interface Software and Technology, vol. 1, No. 1, XP-002193373, 1999, pp. 187-196.

Wei-Ying MA, et al., "A Framework for Adaptive Content Delivery in Heterogeneous Network Environments", XP002168331, Jan. 24, 2000, 14 pages.

Office Action issued Oct. 26, 2010, in Japanese Patent Application No. 2005-67983.

Office Action issued Dec. 14, 2010, in Japanese Patent Application No. 2008-282170.

Office Action issued Feb. 22, 2011, in Japanese Patent Application No. 2008-282170.

* cited by examiner

```
<SPAN id="Felica">
Please download a plug-in that supports extended tags.
<!--
<FELICA>
<PUSH id="$FELICA$"type="url">
   http://www.xxx.co.jp/</PUSH>
<A HREF="felica:$FELICA$">
   Send this information to cellular phone! </A>
</FELICA>
-->
</SPAN>
```

```
<SPAN id="Felica">
Please download a plug-in that supports extended tags.
<!--
<FELICA>
<PUSH>
  U http://www.xxxx.co.jp/ C 10</PUSH>
<A HREF="felica:$FELICA$">
  Send this information to cellular phone! </A>
</FELICA>
-->
</SPAN>
```

INFORMATION PROVIDING SYSTEM, INFORMATION PROVIDING APPARATUS, INFORMATION PROVIDING METHOD, PORTABLE TERMINAL, INFORMATION OUTPUTTING METHOD, AND COMPUTER PROGRAM

CROSS-REFERENCE TO RELATED APPLICATIONS

This application is a Continuation of and claims the benefit of priority from U.S. Ser. No. 11/199,221, filed Aug. 9, 2005, which claims the benefit of priority from Japanese Patent Application Nos. JP 2004-240591, filed Aug. 20, 2004 and JP 2005-067983, filed Mar. 10, 2005, the entire contents of each of which are incorporated herein by reference.

BACKGROUND OF THE INVENTION

1. Field of the Invention

The present invention relates to information providing systems, information providing apparatuses, information providing methods, portable terminals, information outputting methods, and computer programs.

2. Description of the Related Art

In portable terminals such as cellular phones and portable mobile computers, it is possible to connect to the Internet, display Web pages, and so forth. Users can obtain desired information using such portable terminals.

When a user connects to the Internet to obtain desired information using such a portable terminal, the user specifies a URL. However, it is cumbersome to enter a long URL on a portable terminal, which is usually provided with only an input device with small buttons or the like. Thus, information providers provide systems that allow users to obtain information by simple operations using portable terminals so that the users will obtain information they provide. For example, a system in which users enter codes instead of URLs, or a system in which information desired by users can be provided by reading two-dimensional bar codes by cameras provided on portable terminals, have been provided.

For example, according to an information processing system described in Japanese Unexamined Patent Application Publication No. 2002-259248, a user first enters a predetermined access code to a cellular phone so that a code input screen is displayed. Then, a code for identifying a product, which can be found on an advertisement medium such as a Web page or a poster, is input in the code input screen, thereby obtaining information of the product associated in advance with the code from the server.

SUMMARY OF THE INVENTION

However, even in the system described above, the user has to enter an access code and a product identification code to the cellular phone. Furthermore, in order to implement the system described above, an information provider has to develop a program that allows searching for accumulated product information based on the product identification code transmitted from the cellular phone of the user, and incorporate the program in an existing server.

With the Internet developed to such an extent that users can select information from a huge amount of information, for an information provider to prompt users to obtain information it provides, it is desired to develop a system in which users can obtain information by further simplified operations.

In such a system, it is not readily feasible for the information provider and users to introduce new devices or otherwise prepare new facilities in terms of both time and cost. Thus, it is desired to implement the system using existing facilities. For example, it is desirable for both information providers and users if it is possible to provide information to portable terminals of the users from Web pages used by a large number of information providers to provide information by simple operations using browsers commonly used for browsing Web pages.

It is desired that an information providing system, an information providing apparatus, an information providing method, and a computer program that allow a user to obtain information by a simplified operation using existing facilities are provided.

According to an embodiment of the present invention, there is provided an information providing system including a portable terminal including an IC chip, and an information providing apparatus configured to carry out wireless communications with the IC chip included in the portable terminal.

The information providing apparatus includes a browser configured to read content transmitted via a network from an external apparatus and to output the content on a screen based on screen-output control information embedded in data of the content, the screen-output control information defining at least a format for outputting the content on the screen or a data structure of the content, and a wireless communication unit configured to carry out wireless communications with the IC chip included in the portable terminal.

In the data of the content, transmission target information that is to be transmitted to the portable terminal, and transmission control information instructing transmission of the transmission target information to the portable terminal, are also embedded. The browser instructs the wireless communication unit to transmit the transmission target information to the portable terminal based on the transmission control information embedded in the content that has been read. The wireless communication unit, by wireless communications, transmits the transmission target information to the IC chip included in the portable terminal based on the instruction from the browser.

According to the scheme described above, the browser included in the information providing apparatus reads content transmitted from an external apparatus, and outputs the content on the screen based on screen-output control information embedded in data of the content. Furthermore, based on transmission control information embedded in the data of the content, the browser instructs the wireless communication unit to transmit transmission target information also embedded in the data of the content to the IC chip included in the portable terminal. Based on the instruction from the browser, the wireless communication unit transmits the transmission target information to the IC chip located in a range where wireless communications are allowed. The communications between the wireless communication unit and the IC chip are carried out in a contactless manner, i.e., with the IC chip and the wireless communication unit not in contact with each other, or even when in physical contact, not in electrical contact so that electrical conductivity is absent.

The screen-output control information includes, for example, information defining a size or color of characters included in the content, information representing a location of an image that is output on the screen as a part of the content, or information representing a hyperlink, as a format for outputting the content on the screen.

Alternatively, the screen-output control information includes, for example, information representing the starts and ends of a header and a body as a data structure of the content. Based on the screen-output control information defining a data structure, embedded in the content, the browser displays data included in the header in a title bar of the screen, and displays data included in the body as main data on the screen. Furthermore, based on the screen-output control information defining a format, the browser displays characters in the color or size defined, obtains and displays the image based on the location information, and displays the hyperlink in a recognizable way.

Accordingly, the browser that outputs content based on screen-output control information can instruct the wireless communication unit to transmit transmission target information based on transmission control information embedded in data of the content as well as the screen-output control information. Thus, an information provider can provide transmission target information to a portable terminal of a user that is capable of carrying out wireless communications simply by embedding the transmission target information and transmission control information in content that it provides. Furthermore, the user can obtain the transmission target information embedded in the content simply by browsing the content by the information providing apparatus including the browser and placing the portable terminal including the IC chip over the wireless communication unit of the information providing apparatus so that the IC chip enters a range where wireless communications are allowed.

In the information providing system, the portable terminal may be configured to display the transmission target information transmitted from the wireless communication unit to the IC chip on a display screen of the portable terminal. The portable terminal may display the transmission target information as it is on the display screen, or process or edit the transmission target information before displaying it. For example, when a URL is received by the IC chip as the transmission target information, the portable terminal may display the URL as it is on the display screen, or determine by parsing that the transmission target information received by the IC chip is a URL, activate the browser included in the portable terminal to connect to the Internet, retrieve a Web page represented by the URL, and display it on the display screen.

Accordingly, the transmission target information embedded in the content displayed on the information providing apparatus can be displayed on the display screen of the portable terminal simply by placing the portable terminal over the wireless communication unit of the information providing apparatus. The portable terminal ma be configured to display a confirmation message or the like to prompt the user to confirm whether the information is to be displayed before displaying the transmission target information on the display screen, before processing or editing the transmission target information, or displaying processed or edited information on the display screen. Accordingly, display of information not desired by the user on the display screen or retrieval of Web pages not desired by the user can be avoided.

According to another embodiment of the present invention, there is provided an information providing apparatus that carries out wireless communications with an IC chip included in a portable terminal. The information providing apparatus includes a browser configured to read content transmitted via a network from an external apparatus and to output the content on a screen based on screen-output control information embedded in data of the content, the screen-output control information defining at least a format for outputting the content on the screen or a data structure of the content, and a wireless communication unit configured to carry out wireless communications with the IC chip included in the portable terminal. In the data of the content, transmission target information that is to be transmitted to the portable terminal, and transmission control information instructing transmission of the transmission target information to the portable terminal, are also embedded. The browser instructs the wireless communication unit to transmit the transmission target information to the portable terminal based on the transmission control information embedded in the content that has been read. The wireless communication unit, by wireless communications, transmits the transmission target information to the IC chip included in the portable terminal based on the instruction from the browser.

In the data of the content, type information associated with the transmission target information and representing a type of the transmission target information may also embedded so that the browser may instruct the wireless communication unit to transmit the type information associated with the transmission target information together with the transmission target information to the portable terminal. The type information representing the type of the transmission target information refers to information that serves to recognize what the transmission target information is like, e.g., whether the transmission target information is a URL or plain text. Accordingly, the associated type information can also be transmitted to the portable terminal together with the transmission target information. Thus, the portable terminal can recognize the type of the transmission target information with reference to the type information without parsing the transmission target information received by the IC chip. Thus, for example, when the transmission target information is a URL, the portable terminal can recognize that the transmission target information is a URL with reference to the type information, and displays a Web page by activating the browser included in the portable terminal. Alternatively, the type information may include information identifying the type of the content of the transmission target information. The content of the transmission target information refers to information that is obtained by the user when the transmission target information is output by the portable terminal.

The content may be a Web page written in a markup language, and the screen-output control information and the transmission control information may be information identified by tags.

According to another embodiment of the present invention, there is provided a computer program that causes a computer to function as the information providing apparatus described above.

According to another embodiment of the present invention, there is provided an information providing method that is implemented using a portable terminal including an IC chip and an information providing apparatus that carries out wireless communications with the IC chip included in the portable terminal. The information providing method includes the steps, executed by the information providing apparatus, of reading content transmitted via a network from an external apparatus; parsing transmission target information that is to be transmitted to the portable terminal and transmission control information instructing transmission of the transmission target information to the portable terminal, the transmission target information and the transmission control information being embedded in the content that has been read; and transmitting the transmission target information by wireless communications to the IC chip included in the portable terminal based on the transmission control information.

The information providing method may further include the step, executed by the external apparatus, of embedding the transmission control information and the transmission target information in the content provided to the information providing apparatus.

According to another embodiment of the present invention, there is provided a portable terminal including an IC chip configured to carry out wireless communications with an information providing apparatus to receive transmission target information from the information providing apparatus; and a controller configured to output the transmission target information received by the IC chip.

According to the scheme described above, the portable terminal outputs transmission target information received by the IC chip by wireless communications. Thus, the portable terminal obtains transmission target information from the information providing apparatus and outputs the transmission target information when the user simply moves the portable terminal into a range where wireless communications with the information providing apparatus are allowed. Accordingly, the user can obtain information simply by moving the portable terminal into a range where wireless communications with the information providing apparatus are allowed.

The IC chip may receive type information associated with the transmission target information and representing a type of the transmission target information from the information providing apparatus, and the controller may display an image corresponding to the type information on a display screen based on the type information. According to the scheme described above, by displaying an image, the portable terminal can output information in a more user-friendly manner. Furthermore, when the type information received from the information providing apparatus identifies a type of the content of the transmission target information, by displaying an image corresponding to the type information, the user can estimate the content of the transmission target information based on the image displayed. The image displayed on the display screen by the controller may be held by the portable terminal or by an external computer that can establish a communication link with the portable terminal.

The portable terminal may further include an image storage unit configured to store the image in association with the type information; and a decision unit configured to obtain the image associated with the type information received by the IC chip from the image storage unit.

The portable terminal may further include an image storage unit configured to store the image; an image-definition storage unit configured to store the type information in association with the image stored in the image storage unit; and a decision unit configured to obtain the image associated with the type information received by the IC chip from the image storage unit based on the association stored in the image-definition storage unit. According to the scheme described above, association between type information and images can be changed by changing the association stored in the image-definition storage unit.

The transmission target information may be transmitted to the IC chip from a wireless communication unit included in the information providing apparatus according to an instruction by a browser included in the information providing apparatus. The browser may be configured to read content transmitted via a network from an external apparatus, output the content on a screen based on screen-output control information embedded in data of the content, the screen-output control information defining at least a format for outputting the content on the screen or a data structure of the content, and instruct the wireless communication unit to transmit the transmission target information embedded in the data of the content to the IC chip based on transmission control information also embedded in the data of the content. According to the scheme described above, the portable terminal can obtain, by wireless communication, transmission target information embedded in content displayed by the browser included in the information providing apparatus. Thus, the user can obtain information included in content simply by moving the portable terminal into a range where wireless communications with the information providing apparatus displaying the content in which transmission target information is embedded.

According to another embodiment of the present invention, there is provided a computer program that causes a computer to function as the portable terminal described above.

According to another embodiment of the present invention, there is provided an information outputting method that is carried out by the portable terminal described above.

As described above, according to these embodiments of the present invention, an information providing system, an information providing apparatus, an information providing method, a portable terminal, an information outputting method, and a computer program that allow a user to obtain information with a portable terminal by a simplified operation using existing facilities can be provided.

DESCRIPTION OF THE PREFERRED EMBODIMENTS

Now, embodiments of the present invention will be described with reference to the accompanying drawings. In this specification and the drawings, parts having substantially the same functions are designated by the same numerals, and repeated descriptions thereof will be refrained.

First Embodiment

Figure 1:
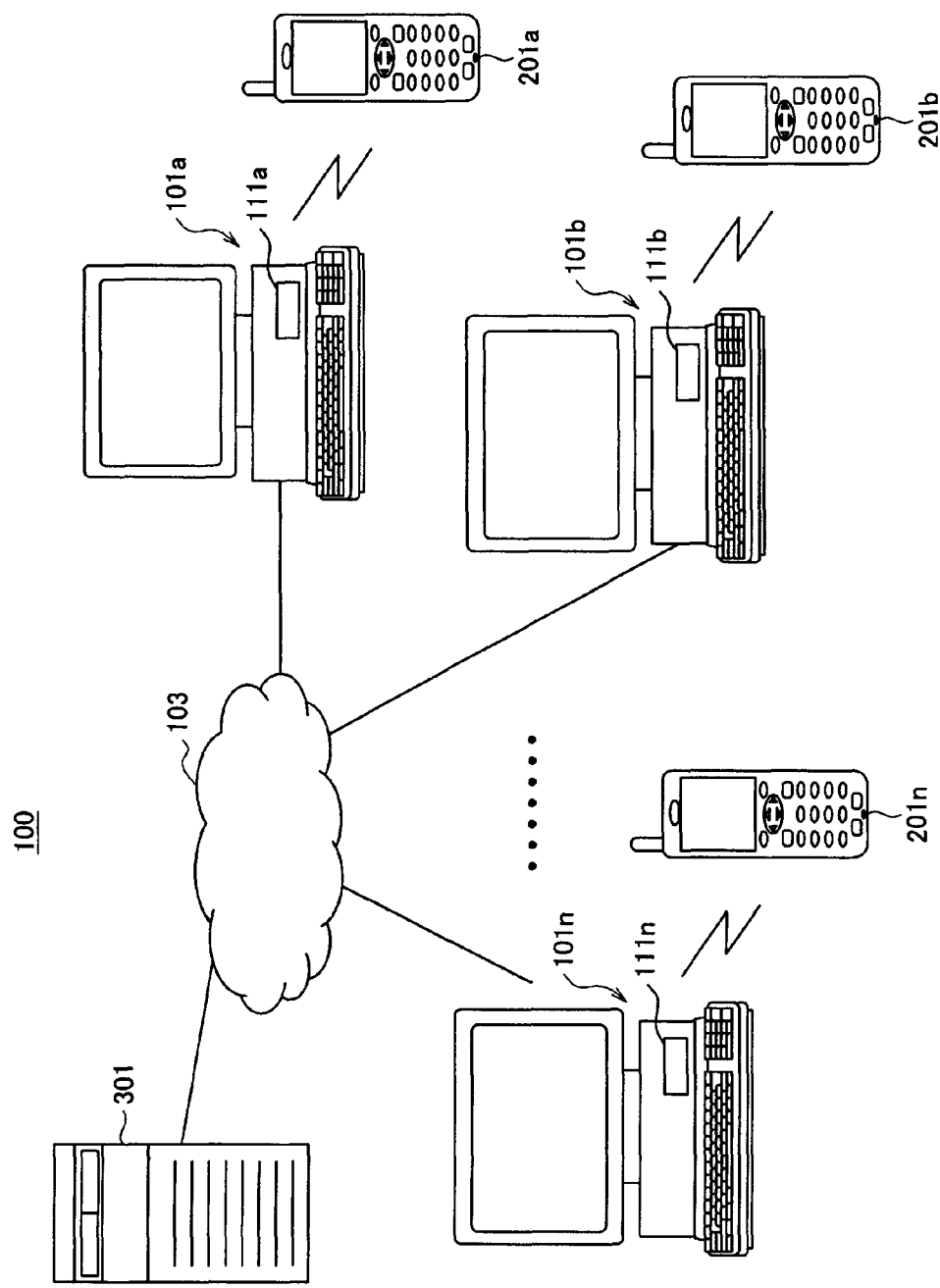
FIG. 1 is a diagram showing an information providing system according to a first embodiment of the present invention.

First, the overall configuration of an information providing system 100 according to a first embodiment of the present invention will be described with reference to FIG. 1. The information providing system 100 includes, for example, a Web server 301, information providing apparatuses 101a, 101b, . . . , 101n (hereinafter simply referred to as information providing apparatuses 101), portable terminals 201a, 201b, . . . 201n (hereinafter referred to as portable terminals 201), and a network 103.

The Web server 301 stores Web pages representing some content, and sends the Web pages to the information providing apparatuses 101 via the network 103 in response to requests from the information providing apparatuses 101. The information providing system 101 may include a plurality of Web servers 301. In this embodiment, an information provider referred to as a content holder uses Web pages to provide information to users. More specifically, the content holder includes information it wishes to provide in Web pages so that the information is provided to users via the information providing apparatuses 101. Furthermore, the content holder embeds information it wishes to provide particularly to the portable terminals 201 of users in data of Web pages as transmission target information, and embeds transmission control information in data of Web pages to cause the information providing apparatuses 101 to send the transmission target information to the portable terminals 201.

In this embodiment, Web pages are written in HTML, and the transmission control information, and screen-output control information, which will be described later, are identified based on tags. The screen-output control information, transmission control information, transmission target information, and so forth, embedded in data of Web pages, are written in HTML files that serve as bases of the Web pages in an HTML-based language extended for operations of IC chips.

An information providing apparatus 101 retrieves a Web page from the Web server 301 and displays it on a display screen. Furthermore, the information providing apparatus 101 sends transmission target information to a portable terminal 201 via a reader/writer 111 based on transmission control information embedded in the Web page. The information providing apparatus 101 is, for example, a personal computer (PC), a television receiver that is capable of displaying Web pages, or game machines.

More specifically, a browser 120 of the information providing apparatus 101 reads the Web page transmitted from the Web server 301. The browser 120 displays the Web page on the display screen based on screen-output control information embedded in the Web page. The screen-output control information defines a format for outputting the Web page on the screen, or a data format of the Web page.

Furthermore, the browser 120, based on the transmission control information embedded in the Web page, instructs the reader/writer ill to send the transmission target information also embedded in the Web page to a contactless IC chip 202 of the portable terminal 201.

The reader/writer 111 is an example of wireless communication unit. The reader/writer 111 sends by wireless communications, the transmission target information to the contactless IC chip 202 located within the coverage of wireless communications based on instructions from the browser 120. The reader/writer 111 may be included in and integrated with the reader/writer 111 as shown in FIG. 1. Alternatively, the reader/writer 111 may be an independent device and connected to the information providing apparatus 101 via a cable.

The portable terminal 201 includes the contactless IC chip 202 that is capable of carrying out wireless communications. The portable terminal 201 receives transmission target information by carrying out communications between the contactless IC chip 202 and the reader/writer 111 of the information providing apparatus 101. Then, the portable terminal 201 displays the transmission target information received by the contactless IC chip 202 on a display screen. The portable terminal 201 is, for example, a cellular phone, a personal digital assistant (PDA), a portable game machine, or a watch, including a contactless IC chip. Alternatively, for example, a card slot for loading an IC card including a contactless IC chip may be provided so that wireless communications can be carried out between the IC card loaded in the card slot and the information providing apparatus 101, whereby transmission target information received by the IC card can be used by the portable terminal 201.

The network 103 allows bilateral communications between the Web server 301 and the information providing apparatus 101. The network 103 is, for example, a public network such as the Internet, a telephone network, or a satellite communication network, or a private network such as a WAN, a LAN, or an IP-VPN, and may be either wired or wireless.

Figure 2:
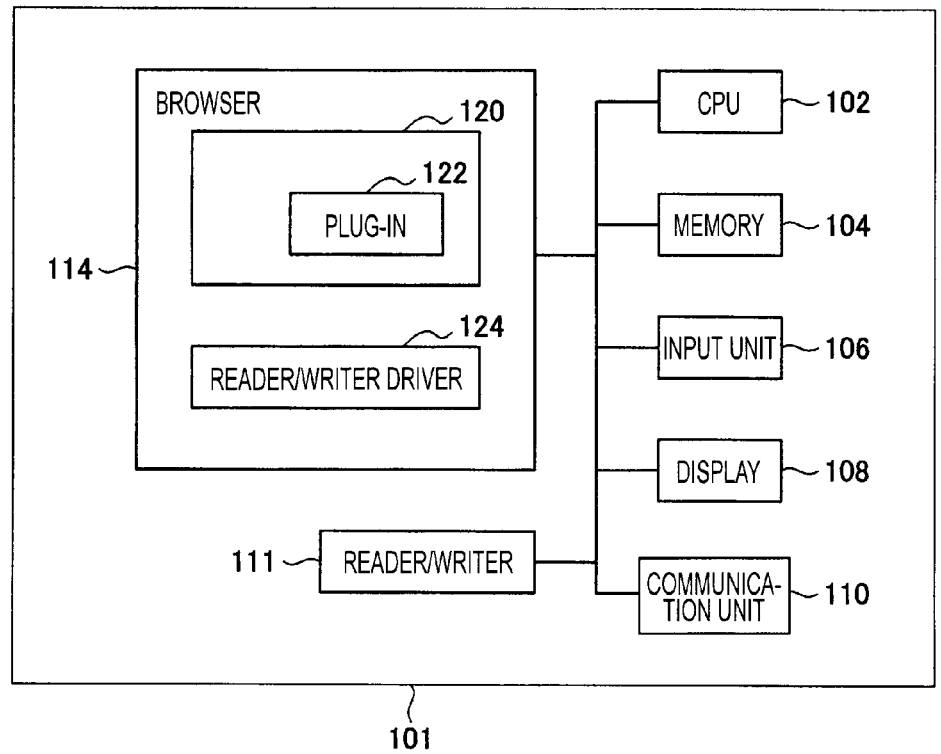
FIG. 2 is a block diagram showing the configuration of an information providing apparatus according to the first embodiment.

The overall configuration of the information providing system 100 has been described above. Next, the configuration of the information providing apparatus 101 according to this embodiment will be described with reference to FIG. 2.

The information providing apparatus 101 includes, for example, a CPU 102, a memory 104, an input unit 106, a display 108, a communication unit 110, a hard disk 114, and a reader/writer 111. The CPU 102 functions as a processor and a controller, and it controls processing by the components of the information providing apparatus 101. The processing executed by the browser 120, which will be described later, is controlled by the CPU 102. The memory 104 is implemented by a ROM and a RAM, and it temporarily stores various data relating to processing by the CPU 102, operation programs for the CPU 102, and so forth.

The input unit 106 includes input devices such as a keyboard and a mouse, and interfaces for accepting data input from the input devices.

The display 108 includes a display device, e.g., a CRT display or a liquid crystal display, and an interface for displaying data on the display device according to instructions from the CPU 102.

The communication unit 110 is a communication interface composed of a communication line, a communication circuit, a communication device, and so forth. The communication unit 110 can exchange information, such as a request for retrieving a Web page and data of a Web page, with external devices such as the Web server 301.

The hard disk 114 is a data storage device implemented, for example, by a flash memory. The hard disk 114 is capable of storing various types of data, such as an operating system (OS) and various application programs. The hard disk 114 is an example of storage device, and it stores a browser 120 and a reader/writer driver 124, which will be described later. The browser 120 and the reader/writer driver 124 may be stored in the memory 104 instead of the hard disk 114. The CPU 102 invokes the browser 120, which is an application program stored in the hard disk 114, and controls processing executed by the browser 120 for displaying Web pages, sending transmission content in Web pages, and so forth.

The reader/writer 111 carries out wireless communications with the contactless IC chip 202. the reader/writer 111 and the contactless IC chip 202 communicate with each other mainly based on the Near Field Communication (NFC) standard, which allows contactless communication within a small distance on the order of 10 cm at an RF carrier frequency of 13.56 MHz and a maximum communication rate of 212 Kbps.

The reader/writer driver 124 stored in the hard disk 114 is a device driver that allows the CPU 102 to control the reader/writer 111.

The browser 120 stored in the hard disk 114 includes a plug-in 122. The plug-in 122 is an application program for adding a function to the browser 120. In this embodiment, a function of instructing the reader/writer 111 to send transmission target information to the contactless IC chip 202 based on transmission control information embedded in a Web page is provided in the form of the plug-in 122. The browser 120 can executing processing so that a Web page is displayed on the display device via the display 108 based on screen-output control information. Furthermore, with the plug-in 122 installed, the browser 120 can execute the processing described above based on transmission control information.

Figures 8, 9:
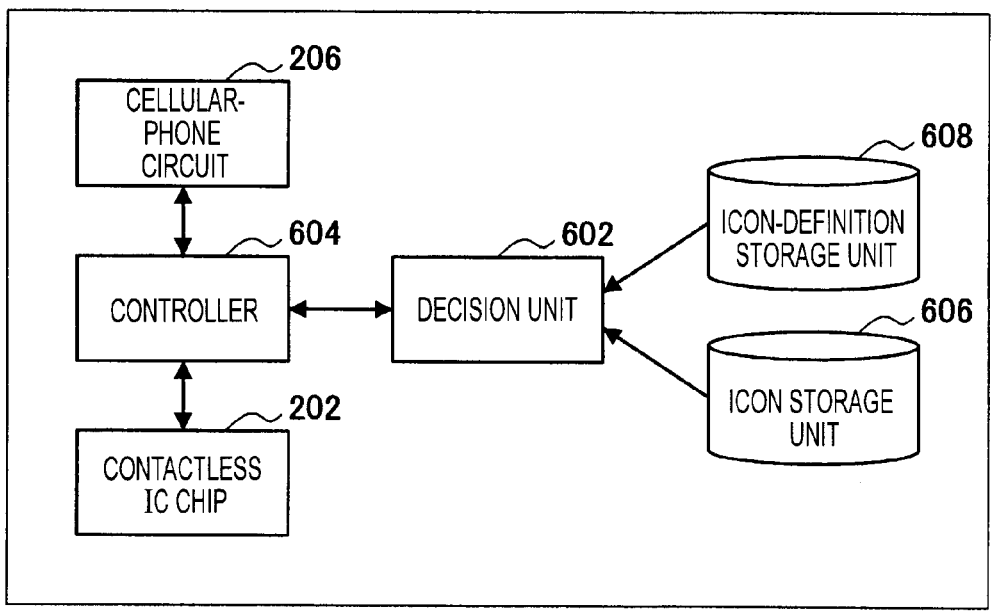
FIG. 8 shows an example of transmission control information according to the first embodiment.
FIG. 9 is a block diagram showing the configuration of a portable terminal according to a second embodiment of the present invention.

The Web page retrieved by the communication unit 110 from the Web server 301 is stored in the memory 104 or the hard disk 114. The browser 120 reads the Web page stored, and when transmission control information identified by tags is embedded in data of the Web page, the browser 120 extracts transmission target information also embedded in the data of the Web page. Now, processing executed by the browser 120 based on the transmission control information will be described in detail with reference to FIG. 8. FIG. 8 shows a specific example of transmission control information and transmission target information embedded in data of a Web page. The browser 120 parses the transmission control information embedded in the data of the Web page, for example, in the following manner, and instructs the reader/writer 111 to send the transmission target information also embedded in the data of the Web page to the contactless IC chip 202.

The browser 120, when it has read an extended tag with an ID "Felica", removes parts other than comments (defined by <!-- and -->) in the "Felica" extended tag, and moves the parts within the comments to the outside of the comments. Then, the browser 120 displays a Web page on the display device via the display 108 based on another set of screen-output control information. Thus, in the Web page displayed, the text "Send this information to cellular phone!", which had been written in the comments, is displayed, while the text "Please download a plug-in that supports extended tags.", which had been written outside the comments but has been removed, is not displayed.

Then, when a user selects the text "Send this information to cellular phone!", the browser 120 fetches "felica:$FELICA$", which is defined by screen-output control information "A HREF" as a link destination of the selected text "Send this information to cellular phone!". The browser 120 checks whether the link destination fetched starts with "felica:", and if so, searches for tags with the same ID as the identifier "$FELICA$" following "felica:".

In this example, a "PUSH" tag, which is an example of transmission control information, is found by the searching as a tag having the same ID. Thus, the browser 120 instructs the communication unit 110 to send the transmission target information "http://www.xxx.co.jp/" sandwiched by "PUSH" tags together with the type information "url" representing the type of the transmission target information to the contactless IC chip 202.

Figure 3:
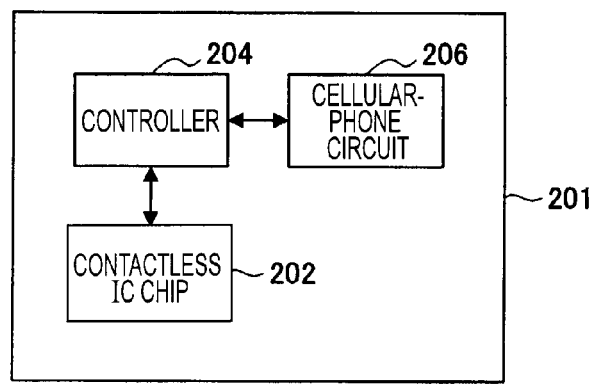
FIG. 3 is a block diagram showing the configuration of a portable terminal according to the first embodiment.

The configuration of the information providing apparatus 101 has been described. Next, the configuration of the portable terminal 201 according to this embodiment will be described with reference to FIG. 3.

The portable terminal 201 includes a contactless IC chip 202, a controller 204, and a cellular-phone circuit 206. The cellular-phone circuit 206 is a circuit relating to cellular-phone functions of the portable terminal 201. Since the cellular-phone circuit is not a main feature of this embodiment, description thereof will be omitted.

The contactless IC chip 202 receives an AC voltage from an antenna (not shown) of the portable terminal 201. The antenna drives the contactless IC chip 202 by a voltage induced by a magnetic field generated by the reader/writer 111 when the contactless IC chip 202 and the reader/writer 111 communicate with each other in a contactless manner, and exchanges data by wireless with the reader/writer 111.

The contactless IC chip 202 includes, for example, a rectifying circuit, a power generator, a demodulator, a modulator, a receiver, a transmitter, a central processing unit (CPU), a ROM, a ROM, an EEPROM, an cryptographic engine, a random number generator, a cyclic redundancy check circuit.

The rectifying circuit rectifies the AC voltage fed from the antenna, and feeds the rectified voltage to the power generator. The power generator generates a power-supply voltage that is used by the contactless IC chip 202 from the voltage fed thereto. The demodulator demodulates signals received from the reader/writer 111 via the antenna into electric signals that can be processed within the contactless IC chip 202, and provides the electric signals to the receiver. The modulator modulates electric signal that is to be sent to the reader/writer 111 from the contactless IC chip 202 via the antenna into signals that can be transmitted by contactless communications.

The CPU operates with the power-supply voltage generated in the contactless IC chip 202 by the power generator, and controls the overall operation of the contactless IC chip 202. The ROM is a non-volatile memory, and it stores applications, an operating system (hereinafter referred to as an OS) that serves as a platform, and so forth.

The RAM is a volatile memory, and it stores data and the like that is temporarily used by the OS and applications. The EEPROM is used mainly for storing user data. However, applications, an OS, and so forth may be stored in the EEPROM. Instead of the EEPROM, a flash memory may be used. The cryptographic engine encrypts and decrypts data exchanged with external devices. The random number generator generates a random number that is used for an encryption key. The cyclic redundancy check circuit performs cyclic redundancy check, i.e., error checking, on data received from external devices.

The transmission target information received by the contactless IC chip 202 from the reader/writer 111 is stored in the RAM in the contactless IC chip 202. The contactless IC chip 202 receives the transmission target information from the reader/writer 111 and stores it in the RAM. When the communication is completed, the contactless IC chip 202 notifies the controller 204 of the completion of communication.

Upon receiving the notification from the contactless IC chip 202, the controller 204 displays the transmission target information received by the contactless IC chip 202 from the reader/writer 111 on the display screen. The controller 204 may display the transmission target information as it is, or process and edit the transmission target information before displaying it. For example, when the transmission target information is a URL, the controller 204 recognizes that the transmission target information is a URL by lexically analyzing the transmission target information, activates the browser of the portable terminal 201 and connects to the network 103, retrieves a Web page from a Web server represented by the URL, and displays the Web page on the display screen. If the contactless IC chip 202 has received the type information of the transmission target information and stored it in the RAM together with the transmission target information, the controller 204 can recognize that the transmission target information is a URL with reference to the type information without performing lexical analysis.

Figure 4:
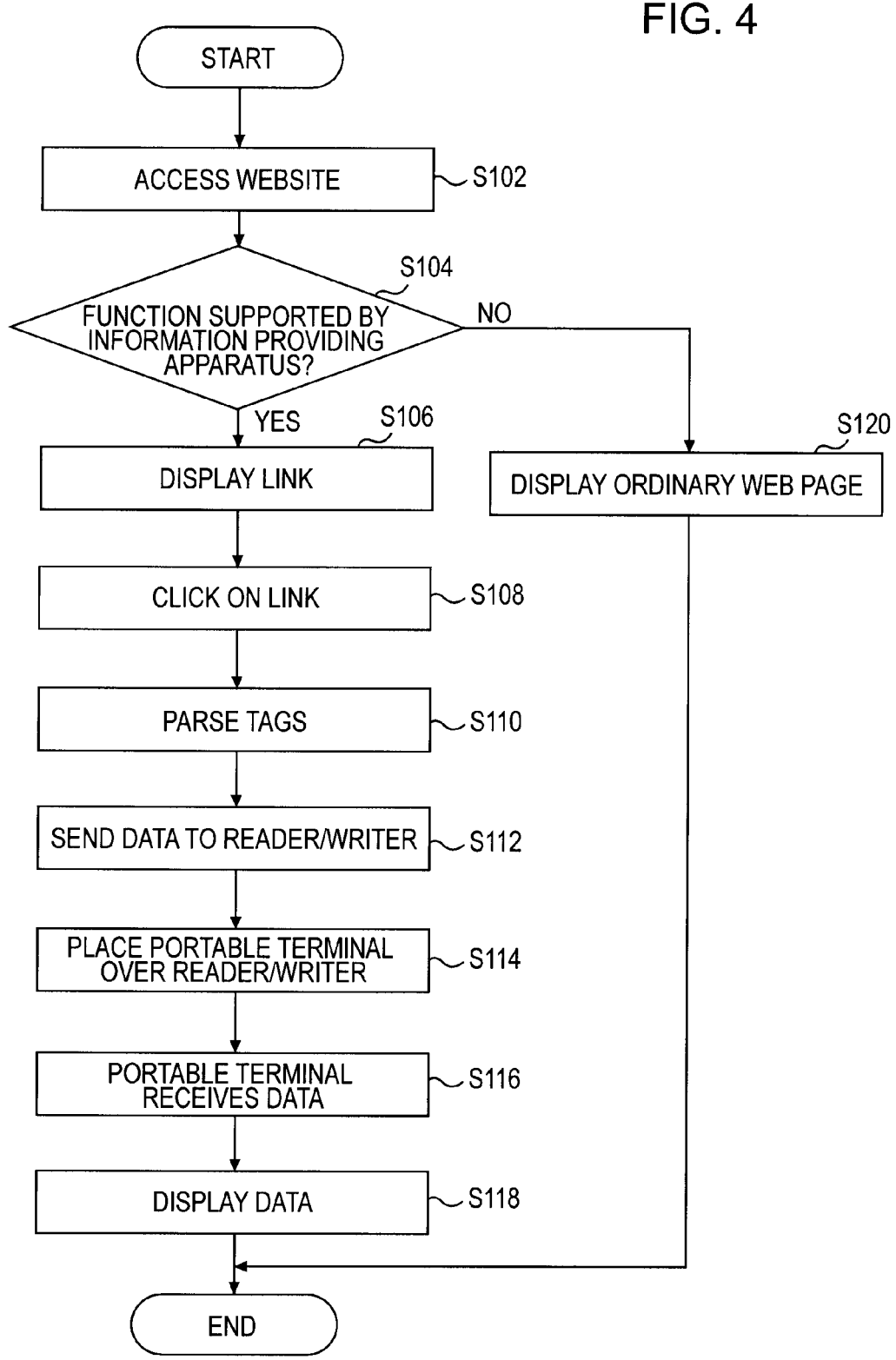
FIG. 4 is a flowchart of a process executed in the information providing system according to the first embodiment.
Figure 5:
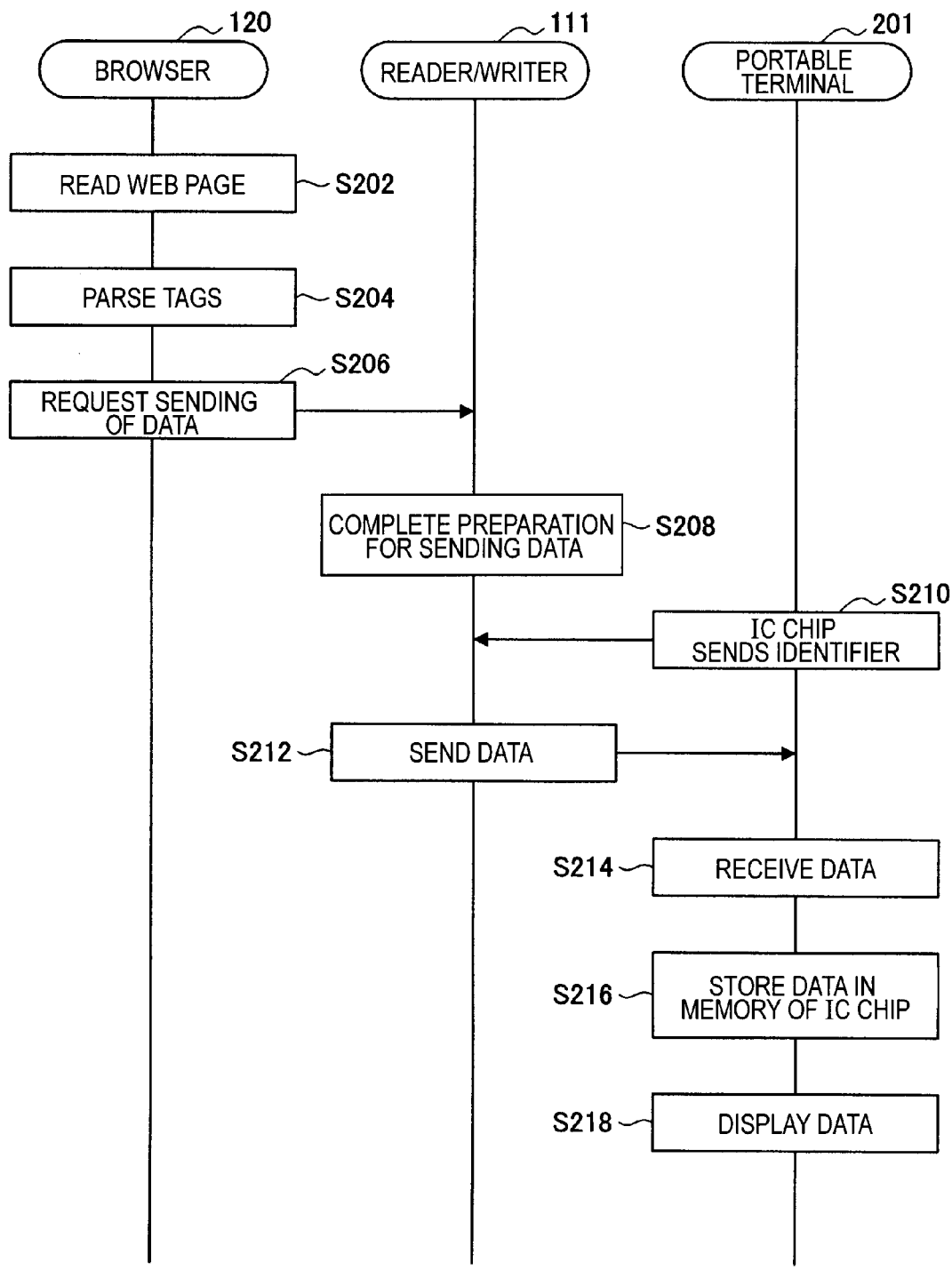
FIG. 5 is a timing chart showing the flow of a process executed by the information providing apparatus and the portable terminal according to the first embodiment.

The configuration of the portable terminal 201 has been described above. Next, the flow of processing executed in the information providing system 100 according to this embodiment will be described with reference to FIG. 4. The following description is given with reference to examples of displayed screens shown in FIGS. 6 and 7.

First, in step S102, the information providing apparatus 101 connects to the Web server 301 via the network 103, and retrieves a Web page. After retrieving the Web page, in step S104, it is determined whether it is possible to process the transmission control information in the information providing apparatus 101. When it is determined in step S104 that it is not possible to process the transmission control information, in step S120, the Web page is ordinarily displayed on the display device of the information providing apparatus 101. More specifically, it is not possible to process the transmission control information when the plug-in 122 is not installed on the information providing apparatus 101. In this case, in the example shown in FIG. 8, the transmission control information and the transmission target information remain as written within the comments. Thus, the browser 120 disregards the transmission control information, and displays the Web page based on screen-output control information.

Figure 6:
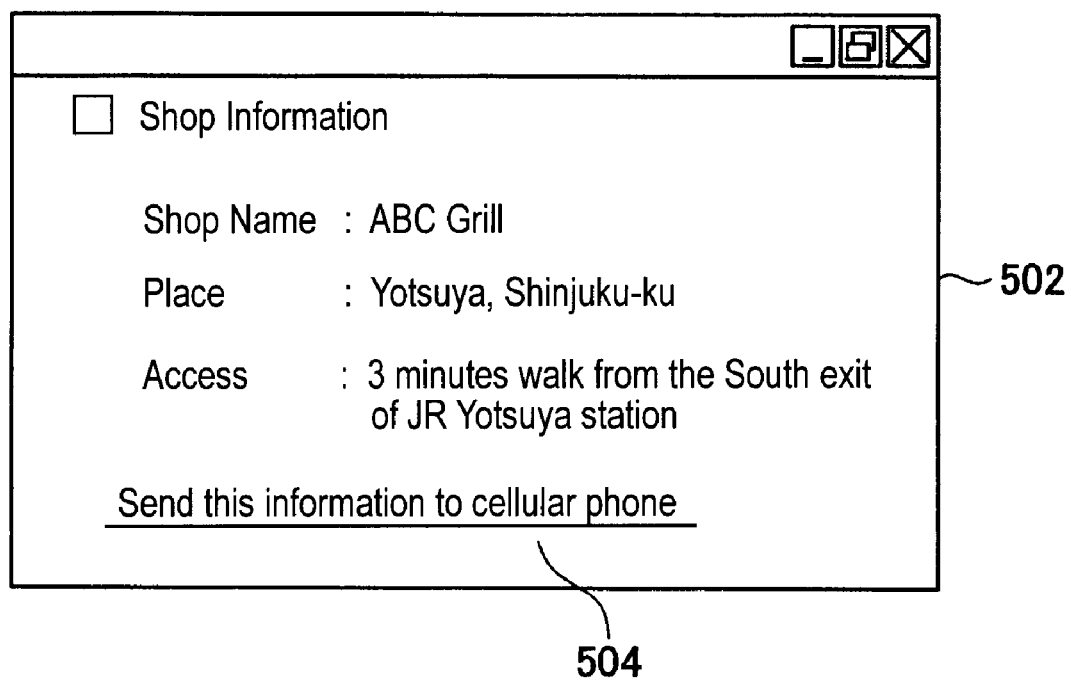
FIG. 6 shows an example of Web page displayed by the information providing apparatus according to the first embodiment.

On the other hand, when the transmission control information can be processed by the information providing apparatus 101, i.e., when the plug-in 122 has been installed, in step S106, as described with reference to FIG. 8, the browser 120 moves the transmission control information and the like to the outside of comments, and a link corresponding to the transmission control information is displayed in the Web page. For example, as shown in FIG. 6, a link 504 is displayed in a Web page 502. Then, when the user selects the link 504 in step S108, in step S110, the browser 120 parses the tags as described with reference to FIG. 8. Then, in step S112, the browser 120 provides the transmission target information and type information to the reader/writer 111 and instructs the reader/writer 111 to send the transmission target information and type information to the contactless IC chip 202.

Figure 7:
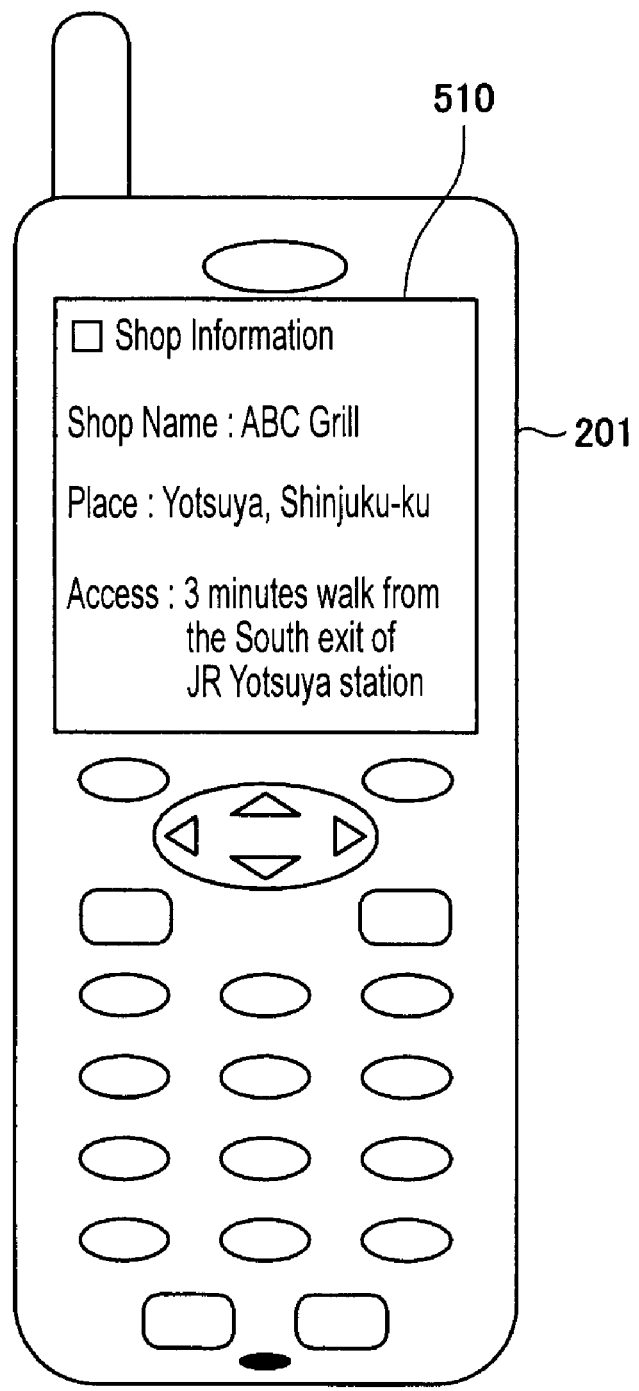
FIG. 7 shows an example of transmission target information displayed by the portable terminal according to the first embodiment.

When the user places the portable terminal 201 over the reader/writer 111 in step S114 so that the contactless IC chip 202 of the portable terminal 201 enters a range where the contactless IC chip 202 can carry out wireless communications with the reader/writer 111, the reader/writer 111 sends the transmission target information and type information to the contactless IC chip 202 of the portable terminal 201 by wireless communications in a contactless manner. In step S116, the contactless IC chip 202 of the portable terminal 201 receives the transmission target information and type information transmitted from the reader/writer 111. Then, in step S118, the controller 204 of the portable terminal 201 displays the transmission target information on the display screen. For example, as shown in FIG. 7, the transmission target information embedded in the Web page is displayed on a display screen 510 of the portable terminal 201.

By the processing described above, the user can obtained information embedded in a Web page by the portable terminal 201 simply by browsing the Web page by the information providing apparatus 101 such as a personal computer, clicking on a link displayed on the Web page, and placing the portable terminal 201 over the reader/writer 111.

The flow of processing executed in the information providing system 100 has been described. Next, the flow of information between the browser 120 and the reader/writer 111 of the information providing apparatus 101 and the portable terminal 201 will be described.

First, in step S202, the browser 120 of the information providing apparatus 101 reads a Web page. In step S204, the browser 120 parses transmission control information (tags) embedded in the Web page. In step S206, the browser 120 extracts transmission target information based on the transmission control information, provides the transmission control information to the reader/writer 111, and instructs the reader/writer 111 to send the transmission target information. For example, transmission target information is embedded in data in a format predefined for data exchanged by wireless communications with the contactless IC chip 202. Also, the user is notified by blinking a part of the reader/writer 111 that transmission is ready, prompting the user to place the portable terminal 201 over the reader/writer 111.

When the portable terminal 201 is moved into a range where wireless communications with the reader/writer 111 are allowed, in step S210, the contactless IC chip 202 of the portable terminal 201 sends information used for wireless communications, such as the identifier of the contactless IC chip 202, to the reader/writer ill. When the party on the other end of wireless communication is identified by the identifier, in step S212, the reader/writer 111 sends the data prepared in step S208 to the contactless IC chip 202 identified by the identifier. The data at least includes transmission target information.

In step S214, the contactless IC chip 202 of the portable terminal 201 receives data from the reader/writer 111, and in step S216, stores the data in the RAM in the contactless IC chip 202. Then, in step S218, the contactless IC chip 202 notifies the controller 204 of the portable terminal 201 that the wireless communication has been completed, the controller 204 displays the transmission target information on the display screen of the portable terminal 201.

The flow between the browser 120 and the reader/writer 111 and the portable terminal 201 has been described.

Second Embodiment

Next, an information providing system according to a second embodiment of the present invention will be described. In the information providing system according to this embodiment, similarly to the first embodiment, based on transmission control information embedded in a Web page, an information providing apparatus sends transmission target information also embedded in the Web page to a portable terminal by wireless communications. Upon receiving the transmission target information, the portable terminal displays the information received on a display screen. The portable terminal according to the second embodiment differs from the portable terminal 201 according to the first embodiment in that in addition to the information displayed by the portable terminal 201 according to the first embodiment, an image relating to the content of the information displayed can be displayed. Now, the information providing system according to the second embodiment will be described with reference to FIGS. 9 to 13.

The overall configuration of the system and the configuration of the information providing apparatus according to the second embodiment are substantially the same as that of the information providing system 100 and that of the information providing apparatus 101 according to the first embodiment, so that descriptions thereof will be omitted.

The configuration of a portable terminal 601 according to this embodiment will be described with reference to FIG. 9. The portable terminal 601 includes, for example, a contactless IC chip 202, a controller 604, a cellular-phone circuit 206, a decision unit 602, an icon-definition storage unit 608, and an icon storage unit 606. The configurations and functions of the contactless IC chip 202 and the cellular-phone circuit 206 are substantially the same as those in the first embodiment, so that descriptions thereof will be omitted.

Upon receiving the notification from the contactless IC chip 202, the controller 604 displays the transmission target information received by the contactless IC chip 202 from the reader/writer 111 on the display screen, similarly to the first embodiment. However, as opposed to the first embodiment, upon receiving the transmission target information from the contactless IC chip 202, the controller 604 provides the transmission target information to the decision unit 602, obtains the type of the transmission target information, a related image, and information to display from the decision unit 602, and displays the image and information on the display screen based on the type obtained from the decision unit 602. In this embodiment, the type information of the transmission target information is included in the transmission target information, and the type is determined by the decision unit 602. Similarly to the first embodiment, the type information includes information identifying the type of mode of transmission target information, such as a url or text information (the information identifying the type of mode of transmission target information will hereinafter be referred to as mode type information). Furthermore, in this embodiment, information identifying the type of content of transmission target information is included in the type information. The content of transmission target information refers to the content of information obtained by the user when the transmission target information is displayed on the display screen or is output by speech. The content is, for example, content regarding foods and drinks, content regarding transportation such as trains or airplanes, or content regarding entertainment. The information identifying the type of content of transmission target information (hereinafter referred to as content-type information) is embedded in a Web page maintained by the Web server 301, similarly to the transmission target information and type information in the first embodiment. The content holder selects an appropriate type in accordance with the content of information to be provided to the portable terminal 601 of the user, and embeds content-type information corresponding to the content type in a Web page.

The decision unit 602 obtains transmission target information from the controller 604, and determines the type of the transmission target information based on the type information included in the transmission target information. The decision unit 602 provides the type determined, information to display, and an image to the controller 604. More specifically, the decision unit 602 determines the mode type, e.g., whether a url or text information, based on the mode type information included in the transmission target information, and provides the result to the controller 604.

Furthermore, the decision unit 602 provides an image relating to the content associated with the content type information included in the transmission target information to the controller 604. In this embodiment, an icon is used as an example of the image. More specifically, the decision unit 602 extracts the content type information from the transmission target information, and obtains an icon associated with the extracted content type information from the icon storage unit 606. The association between the content type information and the icon is defined in the icon-definition storage unit 608.

The icon-definition storage unit 608 is an example of image-definition storage unit. In the icon-definition storage unit 608, content type information is stored in association with icons. The icon-definition storage unit 608 includes a memory, such as the RAM of the portable terminal 601. In the icon-definition storage unit 608, a plurality of pieces of content type information is associated with addresses of a plurality of icons stored in the icon storage unit 606. A plurality of icons may be associated with a single piece of content type information, or each piece of content-type information may be associated with one icon. The association between content type information and icons may be defined in the icon storage unit 606. In this case, the icon-definition storage unit 608 is omitted from the portable terminal 601.

Figure 10:
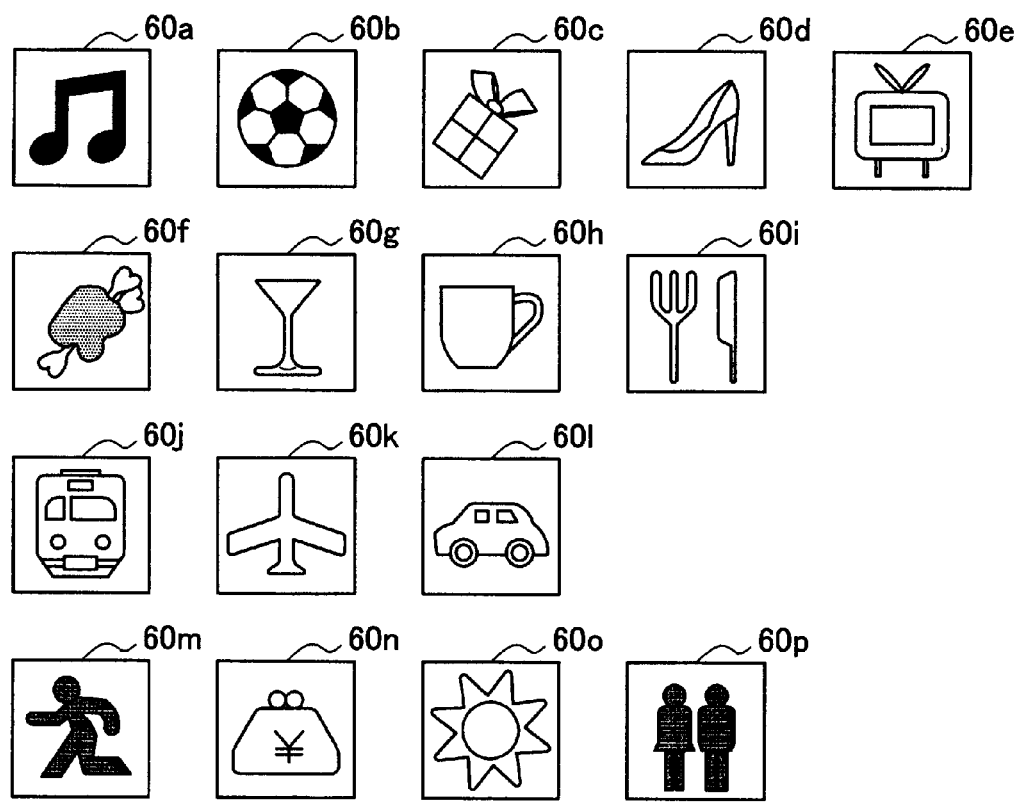
FIG. 10 shows examples of icons according to the second embodiment.
Figure 11:
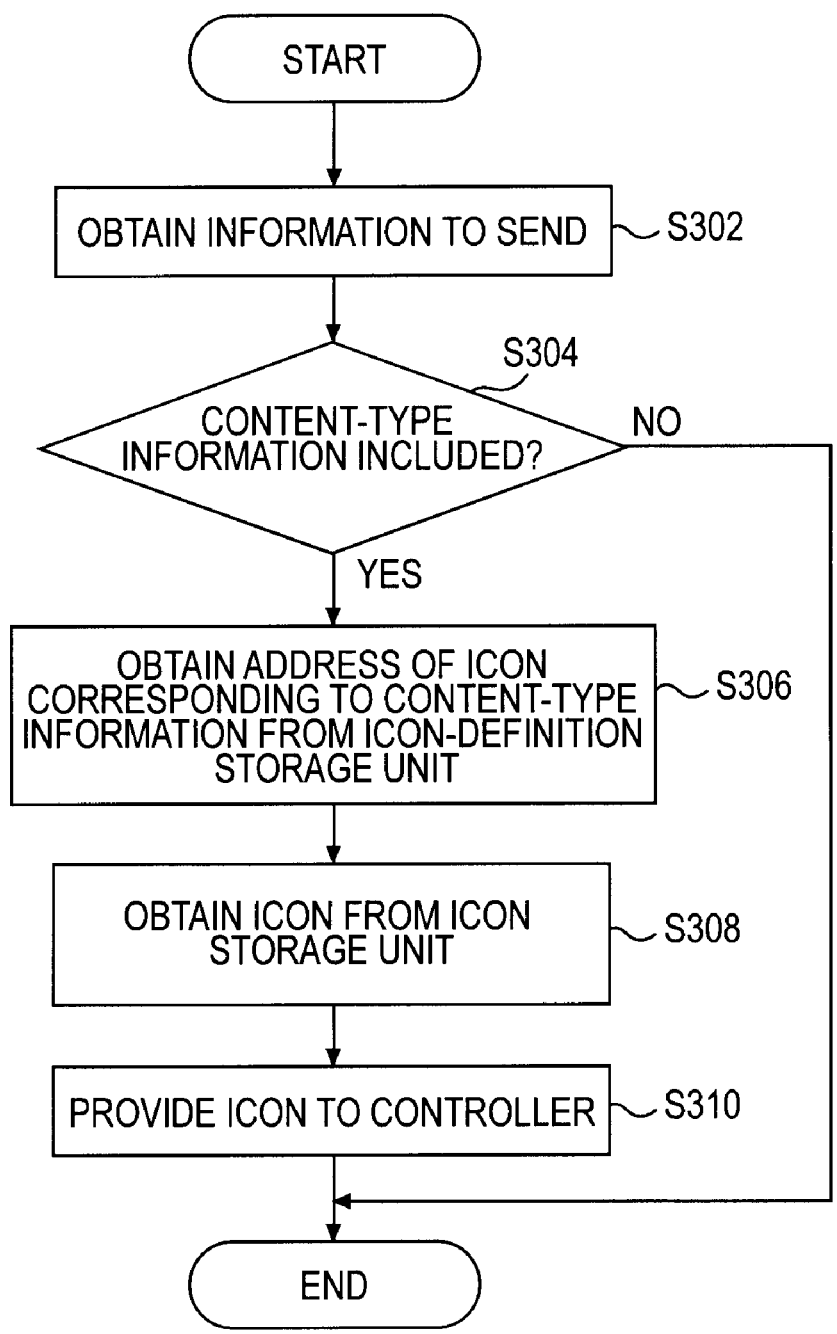
FIG. 11 is a flowchart of a process executed by the portable terminal according to the second embodiment.

The icon storage unit 606 is an example of image storage unit, and it stores icons therein. The icon storage unit 606 includes a memory, such as the RAM of the portable terminal 601. FIG. 10 shows examples of icons stored in the icon storage unit 606. Icons 60a to 60e are displayed on the display screen of the portable terminal 601, for example, when content regarding entertainment is provided by transmission target information. The content regarding entertainment may be further classified so that the icon 60a is displayed when the content relates to music, the icon 60b is displayed when the content relates to sports, and the icon 60e is displayed when the content relates to a television program. Icons 60f to 60i are displayed on the display screen of the portable terminal 601, for example, when content regarding foods and drinks are provided by transmission target information. Icons 60j to 60l are displayed on the display screen of the portable terminal 601, for example, when content regarding transportation is provided by transmission target information. Icons 60m to 60p are displayed on the display screen of the portable terminal 601, for example, when content regarding shopping is provided by transmission target information.

The configuration of the portable terminal 601 has been described above. Next, the flow of a process in which the decision unit 602 obtains an icon based on content type information will be described with reference to FIG. 11.

First, in step S302, the decision unit 602 obtains transmission target information from the controller 604. Upon obtaining transmission target information, in step S304, the decision unit 602 checks whether content-type information is included in the transmission target information. More specifically, for example, an identifier representing content-type information is determined in advance, and the decision unit 602 checks whether the predetermined identifier is included in the transmission target information, and determines that content-type information is included in the transmission target information when the predetermined identifier is included while determining that content-type information is not included in the transmission target information when the predetermined identifier is not included.

When it is determined in step S304 that content-type information is included, in step S306, the decision unit 602 obtains an address of an icon associated with the content-type information included in the transmission target information from the icon-definition storage unit 608.

Then, in step S308, the decision unit 602 obtains the corresponding icon from the icon storage unit 606 according to the address obtained from the icon-definition storage unit 608. Then, in step S310, the decision unit 602 provides the icon obtained in step S308 to the controller 604. The icon provided from the decision unit 602 is displayed on the display screen of the portable terminal 601 by the controller 604.

When a plurality of icons is associated with a single piece of content-type information in the icon-definition storage unit 608, the decision unit 602 may randomly select one icon from a plurality of icons (e.g., the icons 60a to 60e) associated with the content-type information included in transmission target information in the icon-definition storage unit 608.

The flow of the process in which the decision unit 602 obtains an icon based on content-type information has been described. Next, an example of transmission target information displayed on the display screen of the portable terminal 601 will be described.

Figures 12, 13:
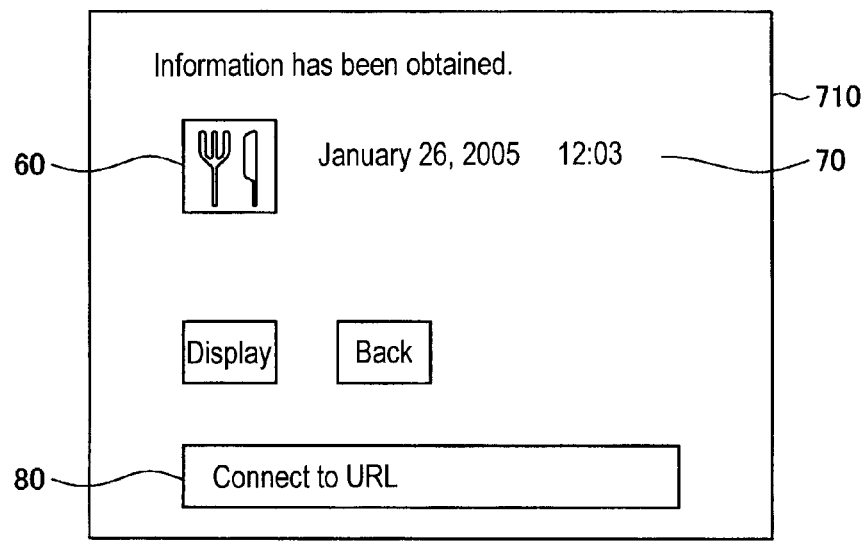
FIG. 12 shows an example of icons and transmission target information displayed by the portable terminal according to the second embodiment.
FIG. 13 shows an example of transmission control information according to the second embodiment.

As shown in FIG. 12, on a display screen of the portable terminal 601, in addition to display information 70 corresponding to transmission target information displayed on the display screen 510 of the portable terminal 201 according to the first embodiment, an icon 60 based on content-type information included in transmission target information and a message 80 based on mode-type information included in the transmission target information are displayed. Thus, the user of the portable terminal 601 can predict the content of information obtained by wireless communications from the information providing apparatus 101 before actually browsing the content. In the example shown, the user can recognize or predict that the information obtained relates to foods and drinks.

An example of transmission target information displayed on the display screen of the portable terminal 601 has been described. Next, a specific example of transmission target information embedded in data of a Web page will be described with reference to FIG. 13.

Descriptions of parts corresponding to those in the example shown in FIG. 8 will be omitted, and the part defined by <PUSH> and </PUSH> which differs from the example shown in FIG. 8, will be described in relation to an operation of the portable terminal 601. In the example shown in FIG. 13, transmission target information is "U http://www.xxx.co.jp/ C 10". In this example, spaces included in the transmission target information are delimiters, "U" is mode-type information, "C" is an identifier of content-type information, and "10" is content-type information. The transmission target information is transmitted from the information providing apparatus 101 to the portable terminal 601. The portable terminal 601 provides the transmission target information received to the decision unit 602. The decision unit 602 reads the transmission target information from the beginning by units separated by delimiters. More specifically, the decision unit 602 first reads "U", and thereby recognizes it as mode-type information representing url. The decision unit 602 recognizes that information that is read next to the mode-type information is information to display on the screen. In this example, the decision unit 602 recognizes that "http://www.xxx.co.jp/" is information to display, and the type of the information is url. Then, the decision unit 602 reads "C", and recognizes that content-type information is included. The decision unit 602 recognizes that information that is read next to the identifier "C" of content-type information is content-type information. In this example, the decision unit 602 recognizes that "10" is content-type information, obtains the address of an icon associated with "10" from the icon-definition storage unit 608, and obtains the corresponding icon from the icon storage unit 606.

The information providing system according to the second embodiment has been described above. In the information providing system according to the second embodiment, a user of a portable terminal can readily know the content of information obtained by wireless communications based on an icon displayed on the portable terminal. A content holder that acts as an information provider can display an icon in accordance with content provided on the portable terminal of the user simply by embedding suitable content-type information in accordance with the content provided in a Web page. This serves to provide information to the user more conveniently and attractively.

Although embodiments of the present invention have been described above with reference to the accompanying drawings, the present invention is not limited to the embodiments described above. It is apparent to those skilled in the art that various alternatives and modifications can be mode within the scope of the claims, and it is to be understood that such alternatives and modifications fall within the technical scope of the present invention.

For example, the content may be included in digital television broadcasting and written in the Broadcast Markup Language (BML), which is a content description language for digital television broadcasting, the information providing apparatus may be a television receiver that receives digital television broadcasting, and a browser provided in the television receiver may be used to display the content written in BML on a screen, so that transmission target information is transmitted to a portable terminal by parsing transmission control information written in BML.

What is claimed is:

1. An information providing system, comprising:
    a portable terminal including an IC chip configured to communicate with an information providing apparatus wirelessly in accordance with Near Field Communication standard and to send chip identification information identifying the IC chip; and
    the information providing apparatus including
        a browser configured to read content transmitted via a network from an external apparatus and to output the content on a screen based on screen-output control information embedded in data of the content, the screen-output control information defining at least a format for outputting the content on the screen or a data structure of the content, and
        a wireless communication unit configured to carry out the wireless communications in accordance with Near Field Communication with the IC chip included in the portable terminal, to receive the identification information from the IC chip, and to identify the IC chip in the portable terminal based on the received identification information,
    wherein transmission target information that is to be transmitted to the portable terminal, and transmission control information instructing transmission of the transmission target information to the portable terminal, are also embedded in the data of the content,
    wherein the browser instructs the wireless communication unit to transmit the transmission target information to the portable terminal based on the transmission control information embedded in the content that has been read, and
    wherein the wireless communication unit, by wireless communications in accordance with Near Field Communication, transmits the transmission target information to the IC chip, identified by the received identification information, included in the portable terminal based on the instruction from the browser.

2. The information providing system according to claim 1, wherein the portable terminal displays the transmission target information transmitted from the wireless communication unit to the IC chip on a display screen of the portable terminal.

3. The information providing system according to claim 1, wherein the IC chip further includes a random number generator configured to generate a random number that is used for an encryption key.

4. The information providing system according to claim 1, wherein the IC chip further includes a cyclic redundancy check circuit configured to perform error checking on data received from external devices.

5. The information providing system according to claim 1, wherein type information associated with the transmission target information and representing a type of the transmission target information is also embedded in the data of the content, and wherein the wireless communication unit is instructed to transmit the associated type information together with the transmission target information.

6. An information providing method that is implemented using a portable terminal including an IC chip configured to communicate with an other device wirelessly in accordance with Near Field Communication standard and to send chip identification information identifying the IC chip, and an information providing apparatus that carries out wireless communications in accordance with Near Field Communication standard with the IC chip included in the portable terminal, the method comprising:

reading, on a browser of the information providing apparatus, content transmitted via a network from an external apparatus and outputting the content on a screen based on screen-output control information embedded in data of the content, the screen-output control information defining at least a format for outputting the content on the screen or a data structure of the content, and carrying out wireless communications, with a wireless communication unit in the information providing apparatus, in accordance with the Near Field Communication with the IC chip included in the portable terminal, to receive the identification information from the IC chip, and to identify the IC chip in the portable terminal based on the received identification information, wherein transmission target information that is to be transmitted to the portable terminal, and transmission control information instructing transmission of the transmission target information to the portable terminal, are also embedded in the data of the content, wherein the browser instructs the wireless communication unit to transmit the transmission target information to the portable terminal based on the transmission control information embedded in the content that has been read, and wherein the wireless communication unit, by wireless communications in accordance with Near Field Communication, transmits the transmission target information to the IC chip, identified by the received identification information, included in the portable terminal based on the instruction from the browser.

7. The information providing method according to claim 6, further comprising the step, executed by the external apparatus, of embedding the transmission control information and the transmission target information in the content provided to the information providing apparatus.

8. The information providing method according to claim 6, wherein the portable terminal displays the transmission target information transmitted from the wireless communication unit to the IC chip on a display screen of the portable terminal.

9. The information providing method according to claim 6, wherein the IC chip further includes a random number generator configured to generate a random number that is used for an encryption key.

10. The information providing method according to claim 6, wherein the IC chip further includes a cyclic redundancy check circuit configured to perform error checking on data received from external devices.

11. The information providing method according to claim 6, wherein type information associated with the transmission target information and representing a type of the transmission target information is also embedded in the data of the content, and wherein the wireless communication unit is instructed to transmit the associated type information together with the transmission target information.

12. A portable terminal, comprising:

an IC chip configured to communicate with an information providing apparatus wirelessly in accordance with Near Field Communication standard, to send chip identification information identifying the IC chip to the information providing apparatus, and to receive transmission target information from the information providing apparatus, the transmission target information is embedded in content received by an external apparatus, the content contains transmission control information; and a controller configured to receive the transmission target information from the IC chip identified by the identification information and output display information based on the transmission target information received by the IC chip on a display screen of the portable terminal.

13. The portable terminal according to claim 12, further comprising:

a cellular-phone circuit configured to perform cellular phone functions.

14. The portable terminal according to claim 12, wherein the IC chip receives an AC voltage from an antenna of the portable terminal.

15. A non-transitory computer readable storage medium, storing computer instructions which when executed by an information providing apparatus including a processor, executes a method for communicating wirelessly in accordance with Near Field Communication standard with a portable terminal including an IC chip which is configured to send chip identification information identifying the IC chip, the method comprising:

reading, on a browser of the information providing apparatus, content transmitted via a network from an external apparatus and outputting the content on a screen based on screen-output control information embedded in data of the content, the screen-output control information defining at least a format for outputting the content on the screen or a data structure of the content, and carrying out wireless communications, with a wireless communication unit in the information providing apparatus, in accordance with the Near Field Communication with the IC chip included in the portable terminal, to receive the identification information from the IC chip, and to identify the IC chip in the portable terminal based on the received identification information, wherein transmission target information that is to be transmitted to the portable terminal, and transmission control information instructing transmission of the transmission target information to the portable terminal, are also embedded in the data of the content, wherein the browser instructs the wireless communication unit to transmit the transmission target information to the portable terminal based on the transmission control information embedded in the content that has been read, and wherein the wireless communication unit, by wireless communications in accordance with Near Field Communication, transmits the transmission target information to the IC chip, identified by the received identification information, included in the portable terminal based on the instruction from the browser.

16. The non-transitory computer readable storage medium according to claim 15, further comprising the step, executed by the external apparatus, of embedding the transmission control information and the transmission target information in the content provided to the information providing apparatus.

17. The non-transitory computer readable storage medium according to claim 15, wherein the portable terminal displays the transmission target information transmitted from the wireless communication unit to the IC chip on a display screen of the portable terminal.

18. The non-transitory computer readable storage medium according to claim 15, wherein the IC chip further includes a random number generator configured to generate a random number that is used for an encryption key.

19. The non-transitory computer readable storage medium according to claim 15, wherein the IC chip further includes a cyclic redundancy check circuit configured to perform error checking on data received from external devices.

20. The non-transitory computer readable storage medium according to claim 15, wherein type information associated with the transmission target information and representing a type of the transmission target information is also embedded in the data of the content, and wherein the wireless communication unit is instructed to transmit the associated type information together with the transmission target information.

* * * * *